Sept. 3, 1963 T. A. RIBICH 3,102,370
APPARATUS FOR PRODUCING A DRILL POINT
Filed April 6, 1960 3 Sheets-Sheet 1
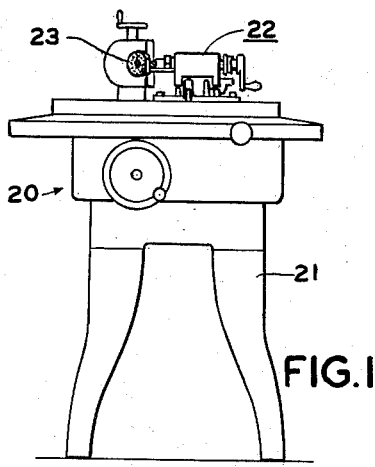
FIG.1
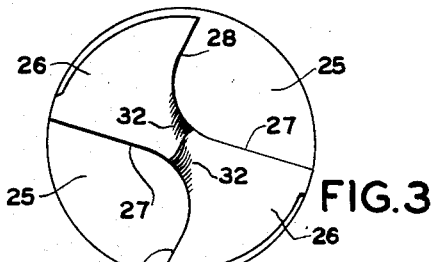
FIG.3
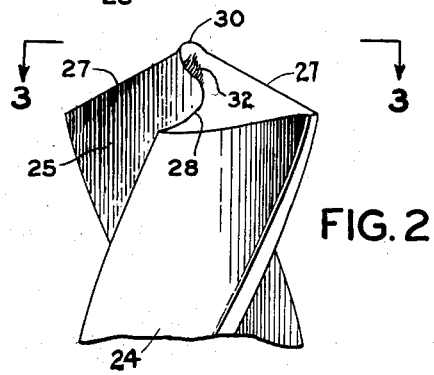
FIG.2
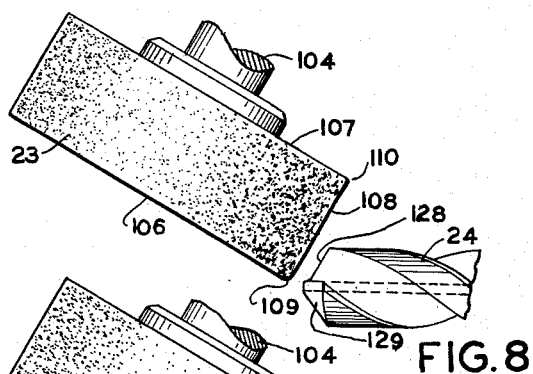
FIG.8
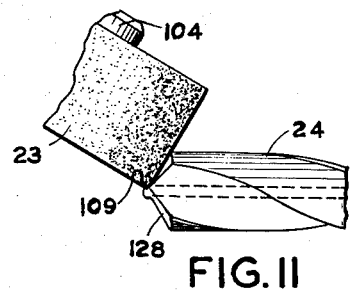
FIG.11
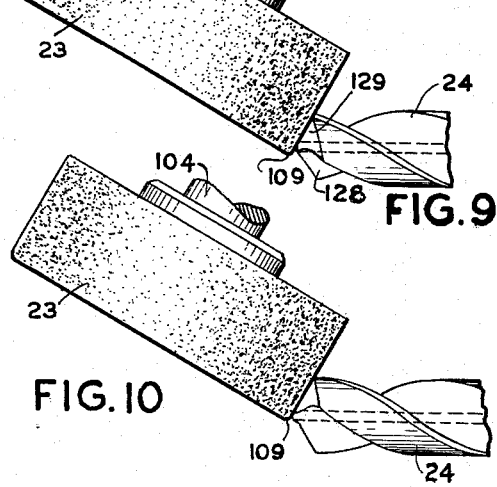
FIG.9
FIG.10
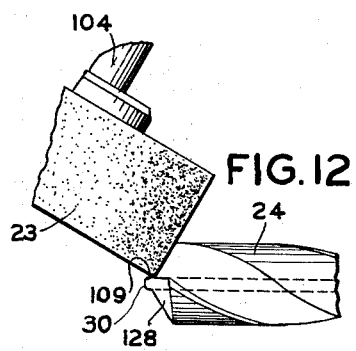
FIG.12
INVENTOR.
THOMAS A. RIBICH
BY Woodling & Krost
ATTORNEYS Sept. 3, 1963 T. A. RIBICH 3,102,370
APPARATUS FOR PRODUCING A DRILL POINT
Filed April 6, 1960 3 Sheets-Sheet 2

INVENTOR.
THOMAS A. RIBICH
BY Woodling & Krost
ATTORNEYS

Sept. 3, 1963  T. A. RIBICH  3,102,370
APPARATUS FOR PRODUCING A DRILL POINT
Filed April 6, 1960  3 Sheets-Sheet 3
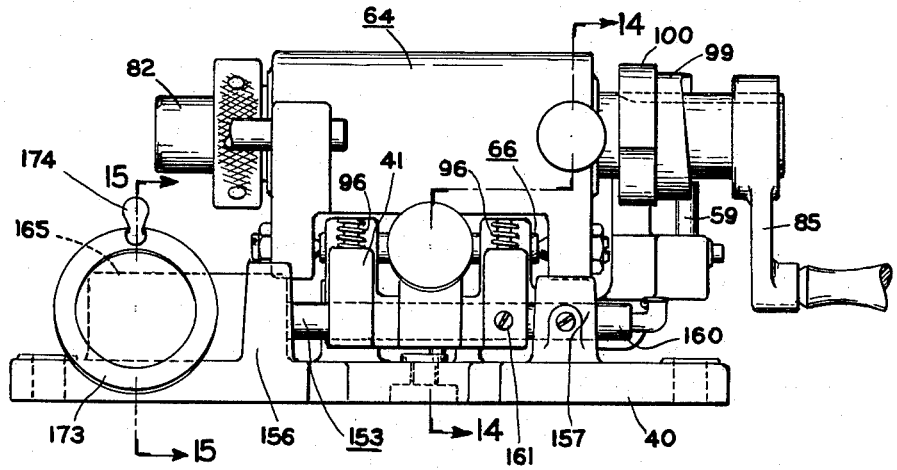
FIG. 13
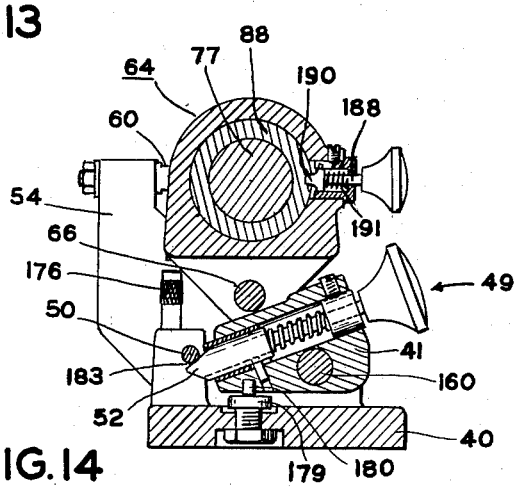
FIG. 14
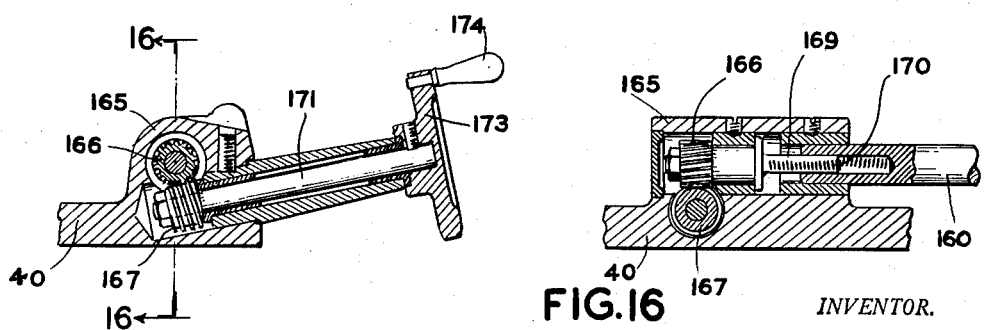
FIG. 15
FIG. 16
INVENTOR.
THOMAS A. RIBICH
BY Woodling & Krost
ATTORNEYS United States Patent Office 3,102,370
Patented Sept. 3, 1963

3,102,370
APPARATUS FOR PRODUCING A DRILL POINT
Thomas A. Ribich, Cleveland, Ohio, assignor to The Weldon Tool Company, a corporation of Ohio
Filed Apr. 6, 1960, Ser. No. 20,501
11 Claims. (Cl. 51—97)

The invention relates in general to drill pointing and more particularly to apparatus for grinding a nonconventional drill point hereinafter referred to as a helical point.

In the conventional drill point, the cutting action is performed by the cutting edge at the extreme point of the drill, commonly called a chisel edge, and by the lips formed at the intersection of the flutes and lands. Cutting conditions at the lips of the drill are comparatively good. However, the chisel edge at the center of the drill creates the greatest disadvantages in this type of drill point. The chisel edge is comparatively flat with the work which it engages, or it might be said it presents an edge which is close to being normal with the axis of the drill. As a result of this, there is no self-centering action and the drill tends to "walk" around on the work until sufficient axial force has been exerted to cause it to enter the work. The advancing portion or part of this chisel edge has an extreme negative rake angle and provides very limited chip escape space. The action of this chisel edge might better be referred to as a pushing or tearing action on the work rather than a cutting action.

The helical point drill has obviated many of these disadvantages. This type drill terminates in a point at the axis of the drill with the cutting edge through the web section curving away on either side of the point and creating a generally convex side elevational appearance rather than the flat appearance of the chisel point of the conventional type drill. This point, since it terminates at the axis of the drill, gives a positive centering action and does away with the tendency of the drill to "walk." The advancing portion or part of this helical point has a considerably reduced negative rake angle and provides greater chip escape space. These features provide increased drill life and truer holes with less drilling force required.

As a result of the advantages of the helical point drill, it has become desirable to obtain methods and apparatus which can efficiently grind this type of point. It has been proposed to produce this type of point by securing the drill to be sharpened in a fixed position and moving the grinding wheel in a complicated pattern about the drill. This has proved to be an expensive and a mechanically elaborate procedure. It has also been proposed to move both the drill and the grinding wheel which has given rise to the same problems.

It is therefore an object of the present invention to provide an apparatus for grinding the referred to helical point which can be accomplished by utilizing the present invention with any conventional tool-grinding machine.

Another object of the invention is to provide apparatus which is simplicity in itself and provides structure for producing a helical drill point without the use of special grinding wheels as the grinding operation may be accomplished on the peripheral face of a wheel.

Another object of the present invention is to provide the construction of the apparatus of the present invention which greatly minimize the possibility of operator error.

Another object of the invention is to provide an apparatus or machine which includes a rotating grinding wheel in fixed position and means for holding and driving a drill to be ground relative to the grinding wheel.

Another object of the invention is to provide an apparatus for driving a drill through rotative, longitudinal, and lateral movements relative to a metal removing means.

Another object of the invention is to provide a machine for grinding the end of a drill by aligning a drill and a grinding wheel surface at an angle relative to each other with the drill point located adjacent a corner of the grinding wheel made by the peripheral surface and the side surface of the grinding wheel and bringing the cutting edge of the drill longitudinally into contact with the peripheral surface and rotating the drill while applying a lateral away from the grinding wheel component of movement to the drill which causes the point to move around the corner of the grinding wheel while sharpening the end of the drill.

Another object of the invention is to provide an apparatus for sharpening a drill which includes a grinding wheel and a drill moving mechanism with a means for conveniently loading and unloading drills before and after sharpening.

Another object of the invention is to provide a simple and positive means for locating a drill point to be ground relative to the means for imparting the lateral, longitudinal and rotative movements to the drill.

Another object of the invention is to provide a means for mounting apparatus for holding and moving a drill or other workpiece to be sharpened relative to a grinding wheel whereby the apparatus and the drill held thereby may be moved into and away from the grinding wheel.

Another object of the invention is to provide an apparatus for sharpening drill points or other workpieces which includes a pivotally mounted rocking head, which carries a shaft movable longitudinally and at generally a right angle with respect to the rocking head with a means for locking out the pivotal movement of the rocking head.

Another object of the invention is to provide an apparatus for sharpening drills and the like which includes a shaft journalled in a rocking head and adapted for rotative and longitudinal movement and with means for holding a drill in an end portion thereof, with a means for locking the shaft in position during loading of the drills to insure the proper relation of the drill to the means utilized to move the shaft longitudinally and the rocking head laterally.

Other objects and a fuller understanding of this invention may be had by referring to the following description and claims, taken in conjunction with the accompanying drawings, in which:

FIGURE 1 is a side elevatonal view of the apparatus or machine constructed under the teachings of the present invention;

FIGURE 2 is a fragmentary side elevational view of a helical point drill produced by the teachings of the present invention;

FIGURE 3 is a view taken along the line 3—3 of FIGURE 2;

FIGURE 8 is an enlarged fragmentary view showing only the grinding wheel and the end of the drill which is to be sharpened and showing the parts in the same position as shown in FIGURE 5, namely, with the handle at six o'clock, or at zero degrees rotation, the starting position;

FIGURES 9 through 12 are similar to FIGURE 8 with the handle of the apparatus having been rotated in a clockwise direction as viewed from the right end of FIGURE 4 through approximately 45°, 90°, 135° and immediately prior to 180°, respectively;

FIGURE 13 is a side elevational view of a modified form of the apparatus constructed under the teachings of the present invention.

FIGURE 14 is a view taken generally along the line 14—14 of FIGURE 13;

FIGURE 15 is a view taken generally along the line 15—15 of FIGURE 13; and

FIGURE 16 is a view taken generally along the line 16—16 of FIGURE 15.

Figure 5:
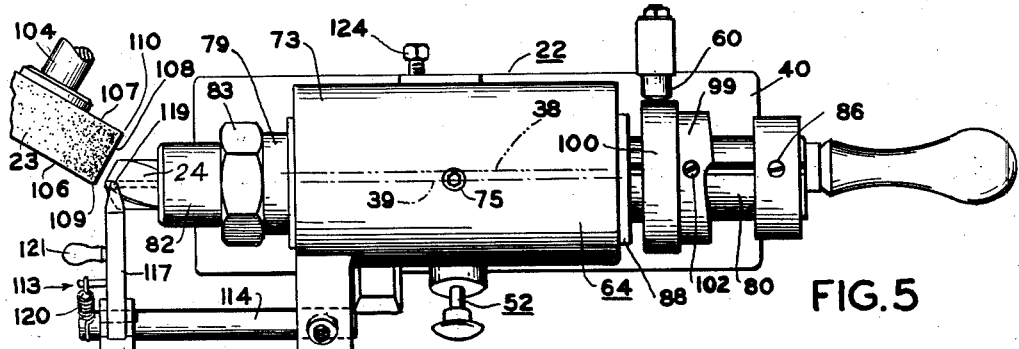
FIGURE 5 is a plan view of the device shown in FIGURE 4.

FIGURE 1 shows generally the apparatus of the present invention indicated generally by the reference numeral 20 and this apparatus or machine includes generally a mounting support 21, drill or workpiece moving means or mechanism 22, and a grinding wheel 23. Means are provided for rotatively driving the grinding wheel but this construction is conventional and will not be further described. The drill moving mechanism 22 may be used in combination with nearly any conventional grinding machine and FIGURE 1 shows the teachings of the present invention in relation to the various parts of a conventional grinding machine.

The object of the present invention is to produce, as mentioned above, a helical point on a drill. The type of drill represented is of the two-lipped type; however, it will be appreciated that it may be of other types and still be produced by the teachings of the present invention. This type of drill has been illustrated in FIGURES 2 and 3 and includes flutes 25 separated by lands 26. The intersection of the flutes and lands produces two cutting lips 27 and two trailing edges 28. The extreme cutting point edge of the drill 30 is of a generally convex configuration with the center of this cutting edge terminating substantially at the axis of the tool with either side of the cutting edge being swept back or being generally at a lower elevation as viewed in FIGURE 2. The cutting edge on either side of the extreme point of the drill performs a cutting action and the portion of the drill immediately in front of each side of the cutting edge at the point is depressed or cut back as at 32 to provide chip escape space.

Figure 4:
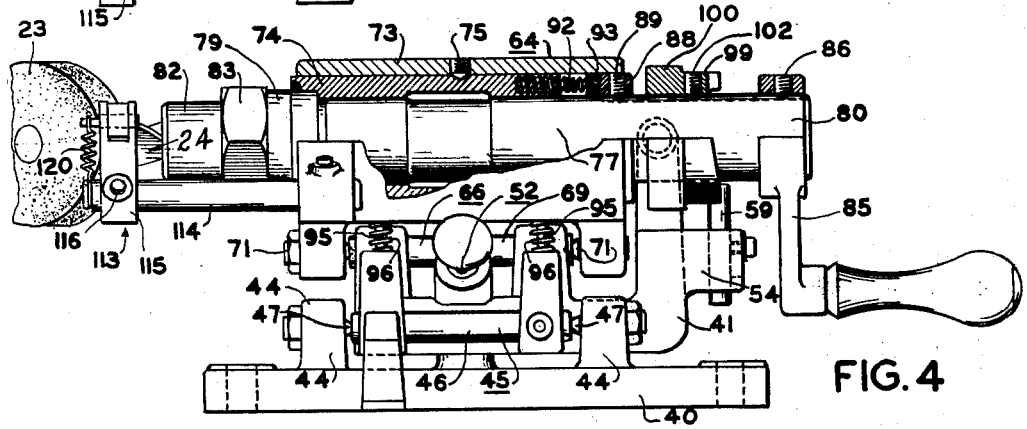
FIGURE 4 is an enlarged view partially in section of a portion of the apparatus shown in FIGURE 1, namely, the drill moving means and the grinding wheel.

FIG. 4 best shows the drill moving mechanism 22 in detail. The drill moving mechanism 22 has a generally horizontally disposed reference axis 38, shown in FIGURES 5, 6, and 7. The drill moving mechanism includes a primary base 40 which is capable of being bolted upon the mounting support 21 and also includes a supplementary base 41. The primary base 40 has spaced vertical members 44 extending therefrom and first pivot means 45 pivotally connect the supplementary and primary base together. The first pivot means 45 includes a shaft 46 carried by the supplementary base and into opposite ends of this shaft, and extending from the vertical members 44 are cone point bearing members 47 which provide for the pivotal mounting of the supplementary base onto the primary base. The reason for pivotally connecting the supplementary base on the primary base will be described hereinafter.

Interlocking means 49 are provided between the supplementary and primary bases so that pivotal movement between the two will only result when it is desired. The interlocking means includes a pin 50 extending between pillars 51 which extend vertically from the primary base 40. A tapered latch member 52 is carried by the supplementary base 41 and is biased by means of a spring 53 to engage the pin 50 and prevent relative movement between the primary and supplementary bases. The supplementary base 41 has an extension 54 on the right end thereof as viewed in FIGURES 4 and 5 and this extension mounts first and second cam followers 59 and 60, respectively. A rocking head 64 having a reference axis 39 is provided and is secured to the supplementary base 41 by second pivot means 66. The second pivot means 66 includes a shaft 69 mounted by the supplementary base and cone point bearing members 71 extending into opposite ends of shaft 69 and are fixed to travel with the rocking head. The rocking head comprises a housing 73 having a sleeve bearing 74 fixedly secured thereto by means of a screw 75. A drive shaft 77 is journaled by the sleeve bearing 74 and is provided with first and second end portions 79 and 80, respectively. The first end portion 79 has a collet type chuck 82 which is well known in the prior art and which includes a nut 83 and spring fingers which are not shown. This collet type chuck is for the purpose of securing a drill 24 to be ground. The second end portion 80 is provided with a handle 85 adjustably secured in position by set screw 86 and the handle is for the purpose of imparting rotational movement to the drive shaft 77. A collar 88 is finally secured to the drive shaft 77 by means of a screw 89 and is adapted to rotate with the shaft. The right end of the sleeve bearing 74 has a plurality of recesses provided therein, only one of which has been shown, which serve to house springs 92 which bear against a nylon or teflon bearing member or other anti-friction bearing material 93. Sliding movement takes place between the collar 88 and the bearing member 93 and under the urging of the springs 92, the drive shaft 77 is continually urged to its rearmost axial position or to the right as viewed in FIGURE 4. Guide pins 95 extend between the supplementary base 41 and the housing 73 and around these pins are springs 96 which urge the rocking head to a first lateral position about the second pivot means 66. The rocking head therefore is always urged by means of the springs 92 and 96 to a position on the axis 38 (FIGURE 6 position) and the drive shaft 77 is always urged to the extreme right as viewed in FIGURES 4 and 5.

Figures 6, 7:
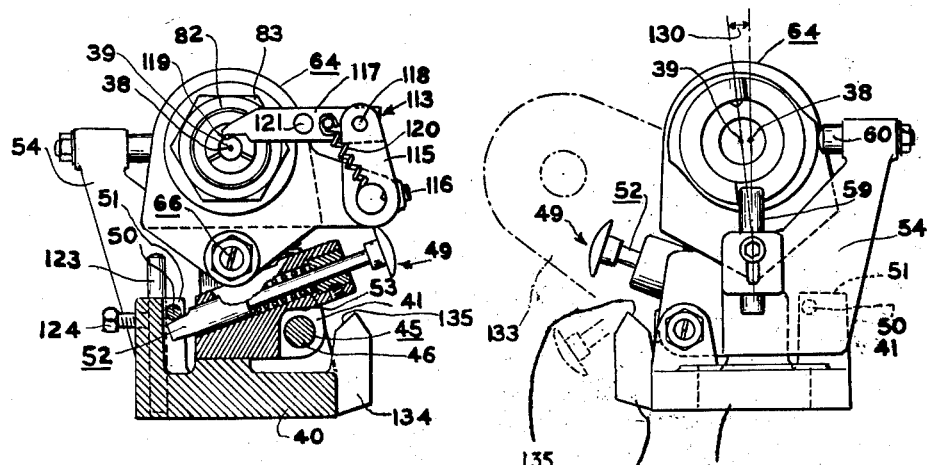
FIGURE 6 is a view taken from the left end of the apparatus shown in FIGURE 4 omitting the grinding wheel and drill and showing some portions of the apparatus broken away for a clearer understanding of the apparatus. This view shows a rocking head in a laterally shifted position as compared to the position in which it is shown in FIGURE 7.
FIGURE 7 is a view of the apparatus shown in FIGURE 4 taken from the right end and with the handle removed.

First and second cams 99 and 100 are fixedly secured to the second end portion of the shaft adjacent the handle by means of a set screw 102 and in this embodiment it will be noted that these cams are integrally formed together and bear a specific relationship to each other. The first cam 99 engages the first follower 59 and upon rotation of the handle 85 causes the drive shaft 77 to be moved axially to the left in accordance with the throw of the cam. The second cam 100 is adapted to engage the second follower 60 and upon rotation of the handle 85 the rocking head is adapted to pivot about the second pivot means 66 through arc 130 (FIGURE 7) in accordance with the throw of cam 100. It will be noted that in FIGURE 6 the axis 39 of the rocking head coincides with the axis 38 of the drill moving mechanism 22, whereas in FIGURE 7, cam 100 has moved the rocking head so that axis 38 and 39 are dispaced from each other through the arc indicated. FIGURE 7 indicates the extreme lateral movement of the rocking head.

A drill positioning device 113 is provided at the left end of the drill moving mechanism and is for the purpose of insuring the proper relationship between the drill to be ground and the first and second integral cams which are fixedly secured to the right end of the shaft 77, as previously described, and is also to insure repetitive location when grinding quantities of drills. This drill positioning device 113 includes a rod 114 which is secured to the housing 73 and to which is fixedly secured an arm 115 by means of a screw 116. A lever 117 is pivotally secured to the arm as at 118. An end 119 of the lever 117 includes a vertical portion which is adapted to engage the intersection of a land and flute to preposition each drill ground so that consistent results can be obtained. A spring 120 holds the end 119 of the lever in engagement with the drill when the drill is being positioned and before actuating the mechanism through a drill sharpening cycle; the lever 117 is moved about its pivotal connection 118 in a clockwise manner, as viewed in FIGURE 6, and it remains in this position because of the over center action of the spring with respect to the pivot 118. A handle 121 is provided for moving lever 117.

The grinding wheel 23 is mounted by a drive shaft 104 and the means previously mentioned rotate the drive shaft 104 and consequently the grinding wheel 23. The grinding wheel includes first and second spaced sides 106 and 107, which sides are interconnected by a peripheral face 108 which defines corners 109 and 110.

In operation, let it be assumed that the apparatus is in the position indicated in FIGURES 4 and 5. The position of the drill end relative to the grinding wheel shown in FIGURE 5 has been enlarged in FIGURE 8. The end of the drill 24 which is to be sharpened has been illustrated as having the upper half or lipped portion 128 sharpened and the lower half or lipped portion 129 unsharpened. The representations of FIGURES 8 through 12 are primarily to illustrate the relative positions of the drill and the grinding wheel as the handle 85 is rotated. Rotation of the handle 85 in a clockwise manner, as viewed from the right end of FIGURES 4 and 5, causes the drive shaft 77 to rotate and causes the first cam 99 acting on follower 59 to start moving the drive shaft 77 axially to the left and slight rotation causes the second cam follower 60 to move to a low point on the second cam 100 and after 45° rotation, the drill assumes the position relative to the grinding wheel shown in FIGURE 9. This position causes the rocking head 64 to coincide or be positioned on the axis 38.

FIGURE 10 illustrates the grinding wheel and drill after the handle has been turned 90° and shows that the extreme point of the drill is moving laterally relative to axis 38 towards the corner 109 of the grinding wheel while cam 99 continually feeds the drill axially in against the grinding wheel. After 135° rotation, the drill and grinding wheel assume the position shown in FIGURE 11 with the extreme point or cutting edge of the drill traveling around the corner 109 of the wheel. Immediately prior to 180° rotation, the drill and grinding wheel assume the position shown in FIGURE 12 and in this position the first cam follower 59 is about to move from a high point on the first cam 99 to a low point which will immediately bring the drill axially to the right by the action of springs 92 to the position shown in FIGURES 5 and 8. A set of four first and second cams 99 and 100, each set with different amounts of axial and lateral throw, will permit the sharpening of a range of drill diameters from 3/32" up to and including 3/4".

The reason for the first pivot means 45 interconnecting the primary and supplementary base will now be described. After a drill has been sharpened, the drill must be removed from the collet type chuck 82. Since the mechanism is primarily front loading and because of the length of many drills, it is desirable that the mechanism be free and clear of the grinding wheel for fast, easy and safe loading and unloading of drills. It is also inconvenient to move the machine table upon which the drill moving mechanism is secured because it is somewhat difficult to reposition the table again in the exact previous position. As a result, when it is desired to load and unload drills, the tapered latch member 52 is pulled against the urging of spring 53 until it clears pin 50. When this has been done, the rocking head along with the supplementary base 41 may be pivotally moved about the first pivot means 45 out of alignment with the grinding wheel into the dot-dash position 133 of FIGURE 7. In this position, a portion of the supplementary base rests against a surface 135 on an abutment 134 which is an integral part of the base 40. When this has been accomplished, a ground drill may be removed and a new drill placed in the chuck and then the supplementary base and rocking head may be shifted back into position for another grinding cycle. This provides an excellent loading and unloading feature.

In the event that it is desired to use the mechanism not to grind the herein disclosed helical point drill, but rather to provide only axial relief on a tool, it is possible to do so by removing the integral first and second cams 99 and 100 and replacing the same with a cam which feeds the drive shaft only axially and not laterally. To locate the rocking head in the correct position when grinding only axial relief, and to insure that it will remain in this position, a pin 123 (FIGURE 6) has been positioned in place upon the primary base 40 and is adjustably secured by means of a screw 124. The end of the pin 123 may be moved vertically into engagement with the rocking head to counteract the action of the springs 96 and hold the rocking head in a fixed lateral position.

By the same token if it is desired to provide only radial relief on a tool, the cam follower 59 can be dropped vertically out of engagement with cam 99. This permits the drive shaft 77 to move to the extreme right as seen in FIGURE 4 because of the action of springs 92 which maintain it in this position. Since the cam follower 59 is out of engagement with cam 99 axial movement will not be transmitted to shaft 77.

FIGURES 13-16 illustrate a modified form of the apparatus of the present invention and one of the more important features of this construction is that the rocking head and the supplementary base are mounted on the primary base in such a manner that they can be moved through a longitudinal travel toward and away from the grinding wheel. This feature provides, in other words, for a fine feed in the event the mounting support, upon which the apparatus is mounted, does not have such a feature. Where the construction of the apparatus shown in FIGURES 13-16 is substantially the same as the structure shown in the device of FIGURES 1-12, like identifying numerals have been utilized and only where the construction has been changed have new identifying numerals been applied. The primary and the supplementary bases have still been identified by the same reference numerals; namely, 40 and 41, respectively. The first pivot means which are utilized to pivotally connect the supplementary base 41 to the primary base have been identified by the reference numeral 153 and comprises first and second spaced bearing members 156 and 157 respectively, integrally secured to the primary base 40 and extending substantially vertically therefrom. A pivot rod 160 is mounted between the first and second spaced bearing members 156 and 157 respectively, and this pivot rod is adapted for longitudinal movement to the right and to the left as seen in FIGURE 13, and rotative movement with respect to the bearing members as can be best visualized in FIGURE 14. The supplementary base 41 is fixedly secured to the pivot rod by means of a screw 161 and, as a result, the supplementary base moves along with and in accordance with the pivot rod 160. As in the device of FIGURES 4-7, interlocking means 49 are provided between the supplementary and primary bases for preventing pivotal movement between these two bases about the first pivot means 153. The same reference numerals have been applied to the interlocking means in this construction as in the constructions of FIGURES 4-7. Similarly in this device, a second pivot means 66 is provided for pivotally connecting the rocking head 64 to the supplementary base.

The means referred to hereinabove for moving the supplementary base and the rocking head longitudinally toward and away from the grinding wheel includes a gear housing 165 formed as a part of one end portion of the primary base 40. Mounted within the gear housing 165 are first and second gear members 166 and 167, respectively. A threaded member 169 is secured to the first gear 166 for rotation therewith and is threadably secured to the left end of the pivot rod 160 as at 170. As a result, rotation of gear 166 causes corresponding movement of the pivot rod and the supplementary base to the right and to the left as shown in FIGURES 13 and 16. A drive shaft or an operating shaft 171 is secured at one end portion to the second gear 167 and extends outwardly of the gear housing 165 and at the other end portion has secured thereto a feed control hand wheel 173. A handle 174 is secured to the wheel 173. In order to provide for sliding movement between the primary and supplementary bases when the pivot rod 160 is moved to the left and to the right as seen in FIGURES 13 and 16, a bearing member 179 is provided on the primary base (FIGURE 14) and a pin member 180 is pressed into the supplementary base and engages the bearing member 179. The sliding movement between the supplementary and primary base therefore occurs between the bearing member 179 and pin member 180 as well as between the pivot rod 160 and bearing members 156 and 157. Another place where sliding movement is provided for is between the tapered latch member 52 and the pin 50 and this place has been identified by the reference numeral 183.

In the event it is desired to utilize the apparatus shown in FIGURES 13–16 to provide only axial relief on a tool or workpiece, it is desirable to lock out the radial or lateral motion of the rocking head about the second pivot means 66. In other words, it is desirable at times to render ineffective the action of the second cam follower 60 and the second cam 100. Means have been provided for accomplishing this and this means acts between the primary base and the rocking head and takes the form of a screw member 176. When the screw member 176 is manipulated in such a manner as to increase its vertical height, it will be noted that the rocking head is rotated about the second pivot means 66 in opposition to springs 96 so that the second cam and cam follower are out of engagement with each other in all rotative positions of the cam 100. As a result, upon rotation of the handle 85 only the cam follower 59 and cam 99 are operative and only axial movement is imparted to the shaft 77.

In order to insure the proper relation of the drill or workpiece to the cams 99 and 100, a spindle locking device is provided. This spindle locking device includes a locking member 188 (FIGURE 14) which has an end portion which is selectively movable into and out of a groove or notch 190 in the collar 88 which is fixedly secured to the drive shaft 77. It will be noted that a spring member 191 normally urges the end portion of the locking member toward reception in the notch or groove 190. This insures, in combination with the positioning means 113 and since the cams are positioned on the shaft in a predetermined position, that the proper relation will be had between the drill or workpiece held by the collet type chuck and the first and second cams.

It will thus be seen that the herein described drill point is produced by locating the drill in relation to the axial and lateral movement cams and by aligning the axis of the drill at an angle with the periphery of the grinding wheel and then placing the first cutting edge of the drill into engagement with the grinding wheel periphery with the extreme point of the drill located adjacent the edge or corner of the grinding wheel. The drill is then rotated about its axis in a direction to bring a corresponding trailing edge into engagement with the grinding wheel periphery while moving the drill into the grinding wheel and generally parallel to the grinding wheel periphery toward the corner or edge which causes the extreme point to by-pass the corner without further engagement with the grinding wheel. Through continued rotation of the shaft, the axial movement of the mechanism withdraws the drill from the grinding wheel before a second cutting edge hits or engages the grinding wheel and the second cutting edge is then positioned into engagement with the grinding wheel periphery and the cycle is repeated.

It will thus be seen that the present invention teaches an apparatus for producing the herein referred to helical drill point which is, in effect, simplicity in itself. The present apparatus permits the grinding of the drill point without special grinding wheels and the operation may be accomplished on the peripheral face of the wheel. The drill moving means of the apparatus imparts three movements to the drill; namely, rotative, longitudinal and lateral movements relative to the grinding wheel which is pre-positioned. The use of the primary and supplementary bases helps provide a construction for conveniently loading and unloading drills after sharpening. It will also be seen that by the use of the apparatus of the present invention that a convenient means for locking out the radial or lateral movement of the rocking head has been provided when this is convenient and desirable, and it is also possible to lock out or do away with the axial movement of the drive shaft. With the spindle locking device, the proper relation between the cams and the workpiece is insured when loading of the workpiece takes place. It will also be noted that a new and novel construction has been provided wherein the rocking head and supplemental base may be moved longitudinally relative to the primary base for positioning work held by the device in relation to the grinding wheel or other metal removing means.

This application is a continuation-in-part of my application, Serial No. 729,732, filed April 21, 1958, for Apparatus for Producing a Drill Point, now abandoned.

Although this invention has been described in its preferred form and preferred practice with a certain degree of particularly, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. Apparatus for grinding drill points including in combination, a mounting support, drill moving means mounted on said support and having a generally horizontally disposed axis, a grinding wheel mounted by a drive shaft and having an axis, means for rotating said drive shaft and grinding wheel, said grinding wheel having first and second spaced sides interconnected by a peripheral face, said grinding wheel axis being located substantially in the same plane as said drill moving means axis and said grinding wheel face disposed at an angle to said drill moving means axis to produce the angle of the finished drill point, said drill moving means comprising a primary base mounted on said support, a supplementary base, first pivot means pivotally connecting said supplementary base to said primary base, interlocking means between said supplementary base and said primary base for preventing pivotal movement between the two, a rocking head, second pivot means pivotally connecting said rocking head to said supplementary base, said rocking head comprising a housing having bearing means mounted therein, a shaft journaled by said bearing means and having first and second end portions, said first end portion having a collet type chuck for securing a drill to be ground, drill positioning means mounted by said housing and including a vertical portion for engaging the intersection of a land and a flute of a drill to be sharpened, said second end portion of shaft having a handle secured thereto for imparting rotational movement to said shaft, spring means acting between said bearing means and said shaft for urging said shaft to a first axial position, spring means acting between said supplementary base and said housing for urging said housing to a first lateral position, first and second integral cam means including respectively first and second cams fixedly secured to said second end portion of said shaft adjacent said handle, first and second cam followers fixedly secured to said supplementary base and cooperating with said first and second cams respectively, said first cam means upon rotation of said shaft causing said shaft and a drill carried by said chuck to move axially toward said grinding wheel face and said second cam means causing said rocking head and shaft to move laterally of said axis and generally away from said grinding wheel face.

2. Apparatus for grinding drill points including in combination, drill moving means and a grinding wheel, said grinding wheel mounted by a drive shaft, means for rotating said drive shaft and grinding wheel, said grinding wheel having first and second spaced sides interconnected by a periphery, said drill moving means comprising a primary base, a supplementary base, first pivot means pivotally connecting said supplementary base to said primary base, interlocking means between said supplementary base and said primary base for preventing pivotal movement between the two, a rocking head, second pivot means pivotally connecting said rocking head to said supplementary base, said rocking head comprising a housing having bearing means mounted therein, a shaft journaled by said bearing means and having first and second end portions, said first end portion having means for securing a drill to be ground in relation to the grinding wheel periphery and in a position to engage said grinding wheel periphery, said second end portion having a handle secured thereto for imparting rotational movement to said shaft, first spring means for urging said shaft to a first axial position, second spring means for urging said rocking head to a first lateral position, first and second cam means including respectively first and second cams fixedly secured to said second end portion of said shaft, first and second cam followers fixedly secured to said supplementary base and cooperating with said first and second cams, respectively, said first cam means upon rotation of said shaft causing said shaft to move toward said grinding wheel periphery and said second cam means causing said rocking head and drive shaft to move laterally and generally away from said grinding wheel periphery.

3. Apparatus for grinding workpieces including in combination, workpiece moving means and a grinding wheel, means for rotating said grinding wheel, said workpiece moving means comprising a rocking head which includes a housing having bearing means, a shaft journalled by said bearing means and having first and second end portions and a generally horizontally disposed axis, said first end portion of said shaft having means for axially receiving and securing a workpiece to be ground in relation to the grinding wheel and in a position to engage a said grinding wheel, said second end portion of said shaft having handle means for imparting rotational movement to said shaft, a supplementary base, pivot means pivotally connecting said rocking head to said supplementary base, a primary base, another pivot means pivotally connecting said supplementary base to said primary base whereby said rocking head and said supplementary base may be moved to an unloading position whereat a workpiece may be axially removed from said holding means at said first end portion of said shaft without interference from said grinding wheel, interlocking means between said supplementary base and said primary base for preventing pivotal movement between the two, first spring means for urging said shaft to a first axial position, second spring means for urging said rocking head to a first lateral position, first and second integral cam means including respectively first and second cams fixedly secured to said first end portion of said shaft, first and second cam followers fixedly secured to said supplementary base and cooperating with said first and second cams respectively, said first cam means upon rotation of said shaft causing said shaft to move toward said grinding wheel and said second cam means causing said rocking head and driving shaft to move laterally and generally away from said grinding wheel.

4. Apparatus for grinding workpieces such as drill points including in combination, workpiece moving means and a grinding wheel, means for rotating said grinding wheel, said workpiece moving means comprising a rocking head which includes a housing having bearing means, a shaft journalled by said bearing means and having first and second end portions and an axis, means for locking said shaft in a fixed position in said bearing means, said first end portion of said shaft having means for axially receiving and securing a workpiece in relation to the grinding wheel and in a position to engage said grinding wheel, said second end portion of said shaft having means for imparting rotational movement to said shaft, a supplementary base, pivot means pivotally connecting said rocking head to said supplementary base, a primary base, another pivot means pivotally connecting said supplementary base to said primary base whereby said rocking head and said supplementary base may be moved to an unloading position whereat a workpiece may be axially removed from said holding means at said first end portion of said shaft without interference from said grinding wheel, interlocking means between said supplementary base and said primary base for preventing pivotal movement between the two about said another pivot means, means including at least a portion of said another pivot means for moving said rocking head and supplementary base toward and away from said grinding wheel independently of said primary base, first spring means for urging said shaft to a first axial position, second spring means for urging said rocking head to a first lateral position, first and second cam means including respectively first and second cams secured to said shaft, first and second cam followers fixedly secured to said supplementary base and cooperating with said first and second cams respectively, said first cam means upon rotation of said shaft causing said shaft to move toward said grinding wheel independently of said housing, said second cam means causing said rocking head and shaft to move laterally with respect to said movement caused by said first cam means and means for rendering said second cam means ineffective to impart said lateral movement to said rocking head and shaft.

5. Apparatus for sharpening workpieces such as drills by moving the workpiece relative to a grinding wheel including in combination workpiece moving means, said workpiece moving means comprising a rocking head which includes a housing having bearing means, a shaft journalled by said bearing means and having first and second end portions and an axis, said first end portion of said shaft having means for axially receiving and securing a workpiece to be ground in relation to a grinding wheel and in a position to engage the grinding wheel, said shaft having means for imparting rotational movement thereto, a supplementary base, pivot means pivotally connecting said rocking head to said supplementary base, a primary base, another pivot means pivotally connecting said supplementary base to said primary base whereby said rocking head and said supplementary base may be moved to an unloading position whereat a workpiece may be axially removed from said holding means at said first end portion of said shaft without interference from a grinding wheel, interlocking means between said supplementary base and said primary base for preventing pivotal movement between the two about said another pivot means, means for moving said rocking head and supplementary base toward and away from a grinding wheel independently of said primary base, first spring means for urging said shaft to a first axial position, second spring means for urging said rocking head to a first lateral position, first and second cam means including respectively first and second cams fixedly secured to said shaft, first and second cam followers cooperating with said first and second cams respectively, said first cam means upon rotation of said shaft causing said shaft to move toward a grinding wheel and said second cam means causing said rocking head and shaft to move laterally with respect to a grinding wheel.

6. Apparatus for sharpening workpieces including in combination, a rocking head having bearing means, a shaft journalled by said bearing means, said shaft having means for receiving and securing a workpiece to be sharpened, means for imparting rotational movement to said shaft, a supplementary base, pivot means pivotally connecting said rocking head to said supplementary base, a primary base, another pivot means pivotally connecting said supplementary base to said primary base whereby said rocking head and said supplementary base may be moved to an unloading position, interlocking means between said supplementary base and said primary base for preventing pivotal movement between the two, means for moving said rocking head with said shaft longitudinally with respect to said primary base, first means for urging said shaft to a first axial position, second means for urging said rocking head to a first lateral position, first and second cam means, said first cam means upon rotation of said shaft causing said shaft to move to a second axial position and said second cam means causing said rocking head and shaft to move to a second lateral position.

7. Apparatus for grinding drill points including in combination, a mounting support, drill moving means mounted on said support and having a generally horizontally disposed axis, a grinding wheel mounted by a drive shaft and having an axis means for rotating said drive shaft and grinding wheel, said grinding wheel having first and second spaced sides interconnected by a peripheral face, said grinding wheel axis being located substantially in the same plane as said drill moving means axis and said grinding wheel face disposed at an angle to said drill moving means axis to produce the angle of the finished drill point, said drill moving means comprising a primary base mounted on said support, a supplementary base, first pivot means pivotally connecting said supplementary base to said primary base, said first pivot means comprising first and second spaced bearing members mounted by said primary base, a pivot rod mounted by said first and second spaced bearing members and adapted for longitudinal and rotative movement with respect thereto, means fixedly securing said supplementary base to said pivot rod, interlocking means between said supplementary base and said primary base for preventing pivotal movement between the two about said first pivot means, a rocking head, second pivot means pivotally connecting said rocking head to said supplementary base, means for moving said supplementary base and said rocking head toward and away from said grinding wheel including gear means mounted on said primary base, a threaded member secured to said gear means at one portion and threadably connected to said pivot rod at another portion for longitudinally moving said pivot rod upon rotation of said gear means, an operating shaft connected at one end portion thereof to said gear means and having an operating hand wheel connected to the other end portion thereof whereby said gear means may be rotated, said rocking head comprising a housing having bearing means mounted therein, a shaft journaled by said bearing means and having first and second end portions, said first end portion having a collet type chuck for securing a drill to be ground, drill positioning means mounted by said housing and including a vertical portion for engaging the intersection of a land and a flute of a drill to be sharpened, said second end portion of said shaft having a handle secured thereto for imparting rotational movement to said shaft, first spring means acting between said bearing means and said shaft for urging said shaft to a first axial position, second spring means acting between said supplementary base and said housing for urging said housing to a first lateral position, first and second integral cam means including respectively first and second cams fixedly secured to said second end portion of said shaft adjacent said handle, first and second cam followers fixedly secured to said supplementary base and cooperating with said first and second cams, respectively, said first cam means upon rotation of said shaft causing said shaft and a drill carried by said chuck to move axially toward said grinding wheel periphery and said second cam means causing said rocking head and shaft to move laterally of said axis and generally away from said grinding wheel periphery and means for selectively acting between said primary base and said rocking head for holding said second cam out of engagement with said second cam follower against the urging of said second spring means, a locking member mounted by said housing and selectively engageable with said shaft for locking said shaft in a predetermined position whereby said locking member in combination with said drill positioning means insures the proper relation between a drill held by said collet type chuck and said first and second integral cam means.

8. Apparatus for grinding drill points including in combination, a mounting support, drill moving means mounted on said support and having a generally horizontally disposed axis, a grinding wheel mounted by a drive shaft, means for rotating said drive shaft and grinding wheel, said drill moving means comprising a primary base mounted on said support, a supplementary base, first pivot means pivotally connecting said supplementary base to said primary base, said first pivot means comprising first and second spaced bearing members mounted by said primary base, a pivot rod mounted by said first and second spaced bearing members and adapted for longitudinal and rotative movement with respect thereto, means fixedly securing said supplementary base to said pivot rod, interlocking means between said supplementary base and said primary base for preventing pivotal movement between the two, a rocking head, second pivot means pivotally connecting said rocking head to said supplementary base, means for moving said supplementary base and said rocking head toward and away from said grinding wheel including gear means mounted on said primary base, a member secured to said gear means at one portion and connected to said pivot rod at another portion for longitudinally moving said pivot rod upon rotation of said gear means, an operating shaft connected at one end portion thereof to said gear means and having an operating wheel connected to the other end portion thereof whereby said gear means may be rotated, said rocking head comprising a housing having bearing means mounted therein, a shaft journaled by said bearing means and having first and second end portions, said first end portion having means for securing a drill to be ground, said second end portion of said shaft having a handle secured thereto for imparting rotational movement to said shaft, first spring means for urging said shaft to a first axial position, second spring means for urging said rocking head to a first lateral position, first and second cam means including respectively first and second cams secured to said second end portion of said shaft adjacent said handle, first and second cam followers secured to said supplementary base and cooperating with said first and second cams, respectively, said first cam means upon rotation of said shaft causing said shaft and a drill carried thereby to move axially toward said grinding wheel to a second axial position and said second cam means causing said rocking head and shaft to move laterally of said axis to a second lateral position, and means for use between said primary base and said rocking head for rendering said second cam means ineffective to impart said lateral movement to said rocking head and shaft.

9. Apparatus for grinding workpieces including in combination, a grinding wheel mounted by a drive shaft, means for rotating said drive shaft and grinding wheel, a primary base, a supplementary base, first pivot means pivotally connecting said supplementary base to said primary base, said first pivot means comprising first and second spaced bearing members mounted by said primary base, a pivot rod mounted by said first and second spaced bearing members and adapted for longitudinal and rotative movement with respect thereto, means fixedly securing said supplementary base to said pivot rod, interlocking means between said supplementary base and said primary base for preventing pivotal movement between the two, a rocking head, second pivot means pivotally connecting said rocking head to said supplementary base, means for moving said supplementary base and said rocking head toward and away from said grinding wheel including gear means mounted on said primary base, a member secured to said gear means at one portion and connected to said pivot rod at another portion for longitudinally moving said pivot rod upon rotation of said gear means, an operating shaft connected at one end portion thereof to said gear means and having an operating wheel connected to the other end portion thereof whereby said gear means may be rotated, said rocking head comprising a housing having bearing means mounted therein, a shaft journaled by said bearing means and having first and second end portions, said first end portion having means for securing a workpiece to be ground, said second end portion of said shaft having a handle secured thereto for imparting rotational movement to said shaft, first spring means for urging said shaft to a first axial position, second spring means for urging said rocking head to a first lateral position, first and second cam means including respectively first and second cams secured to said second end portion of said shaft adjacent said handle, first and second cam followers secured to said supplementary base and cooperating with said first and second cams, respectively, said first cam means upon rotation of said shaft causing said shaft and a workpiece carried thereby to move axially toward said grinding wheel to a second axial position and said second cam means causing said rocking head and shaft to move laterally of said axis to a second lateral position.

10. Apparatus for sharpening workpieces including in combination, a rocking head having bearing means, a shaft journaled by said bearing means, said shaft having means for receiving and securing a workpiece to be sharpened, means for imparting rotational movement to said shaft about a first axis, a supplementary base, pivot means pivotally connecting said rocking head to said supplementary base about a second axis generally parallel to said first axis, a primary base, another pivot means pivotally connecting said supplementary base to said primary base about a third axis generally parallel to said first and second axes whereby said rocking head and said supplementary base may be moved to an unloading position, interlocking means between said supplementary base and said primary base for preventing pivotal movement between the two, means for moving said supplementary base and said rocking head with said shaft in an axial direction generally parallel to said axes and relative to said primary base, first means for urging said shaft to a first axial position, second means for urging said rocking head to a first lateral position, first and second cam means, said first cam means upon rotation of said shaft causing said shaft to move to a second axial position and said second cam means causing said rocking head and shaft to move to a second lateral position.

11. Apparatus for sharpening workpieces including in combination, a rocking head having bearing means, a shaft journaled by said bearing means, said shaft having means for receiving and securing a workpiece to be sharpened, means for imparting rotational movement to said shaft about a first axis, a supplementary base, pivot means pivotally connecting said rocking head to said supplementary base to pivot same about an axis generally parallel to said first axis, a primary base, another pivot means pivotally connecting said supplementary base to said primary base to pivot same about an axis generally parallel to said first axis whereby said rocking head and said supplementary base may be moved to an unloading position, interlocking means between said supplementary base and said primary base for preventing pivotal movement between the two, means for moving said supplementary base with said rocking head and said shaft in an axial direction generally parallel to said first axis and relative to said primary base, first and second cam means, said first cam means causing said shaft to move from a first to a second axial position and said second cam means causing said rocking head and shaft to move from a first to a second lateral position.

References Cited in the file of this patent
UNITED STATES PATENTS

| | | |
|---|---|---|
| 1,379,853 | Cogsdill | May 31, 1921 |
| 1,674,224 | Rabut | June 19, 1928 |
| 2,035,163 | Holmberg | Mar. 24, 1936 |
| 2,356,175 | Olson et al. | Aug. 22, 1944 |
| 2,371,676 | Coyne | Mar. 20, 1945 |
| 2,536,864 | Strickland et al. | Jan. 2, 1951 |
| 2,538,651 | Parker | Jan. 16, 1951 |